United States Patent [19]

Masao et al.

[11] Patent Number: 4,847,779
[45] Date of Patent: Jul. 11, 1989

[54] SIMULTANEOUS TWO-AXIS NUMERICAL CONTROL METHOD FOR AN INJECTION-MOLDING MACHINE AND AN APPARATUS THEREFOR

[75] Inventors: Kamiguchi Masao, Houya; Umemoto Hiroshi, Hino, both of Japan

[73] Assignee: Fanuc Ltd, Minamitsuru, Japan

[21] Appl. No.: 163,972

[22] PCT Filed: Jun. 23, 1987

[86] PCT No.: PCT/JP87/00412
§ 371 Date: Feb. 2, 1988
§ 102(e) Date: Feb. 2, 1988

[87] PCT Pub. No.: WO87/07867
PCT Pub. Date: Dec. 30, 1987

[30] Foreign Application Priority Data

Jun. 23, 1986 [JP] Japan ................................ 61-144951

[51] Int. Cl.$^4$ .............................................. B29C 45/76
[52] U.S. Cl. .................................... 364/476; 264/40.1;
264/40.5; 264/40.7; 318/574; 318/625;
364/167.01; 425/135; 425/161; 425/165;
425/166
[58] Field of Search .................... 364/474, 476, 167.01;
318/38, 575, 625, 567, 569, 574; 264/40.1, 40.5,
40.7, 328.1; 425/135, 139, 145, 149, 150, 155,
156, 157, 159, 160, 161, 162, 165, 169, 171, 166

[56] References Cited

U.S. PATENT DOCUMENTS 4,629,955 12/1986 French et al. ...................... 318/625
4,674,053 6/1987 Bannai et al. ...................... 364/476
4,695,237 9/1987 Inaba ................................. 264/40.7

FOREIGN PATENT DOCUMENTS 61-19328 1/1986 Japan.

Primary Examiner—Jan H. Silbaugh
Assistant Examiner—Jill L. Heitbrink
Attorney, Agent, or Firm—Staas & Halsey

[57] ABSTRACT

A numerical control method and an apparatus therefor, in which a mold opening operation or an eject operation is performed during a metering operation so that the injection-molding cycle time is shortened. When a cooling period terminates or mold opening is completed during the metering operation, a programmable machine controller for sequentially controlling an injection-molding machine delivers information specifying a clamp axis or an eject axis, the displacement, moving speed, and moving direction of the axis, and a step feed command to a numerical control unit for controlling servomotors for axes of the injection-molding machine, through a common RAM. Pulse distribution for the clamp axis or the eject axis, based on this information, and pulse distribution for a screw rotating axis are alternately executed by a numerical control unit, which responds to the step feed command. Thus, the screw rotating axis is driven simultaneously with the clamp axis or the eject axis, so that the mold opening or eject operation can be performed during the metering operation.

10 Claims, 4 Drawing Sheets

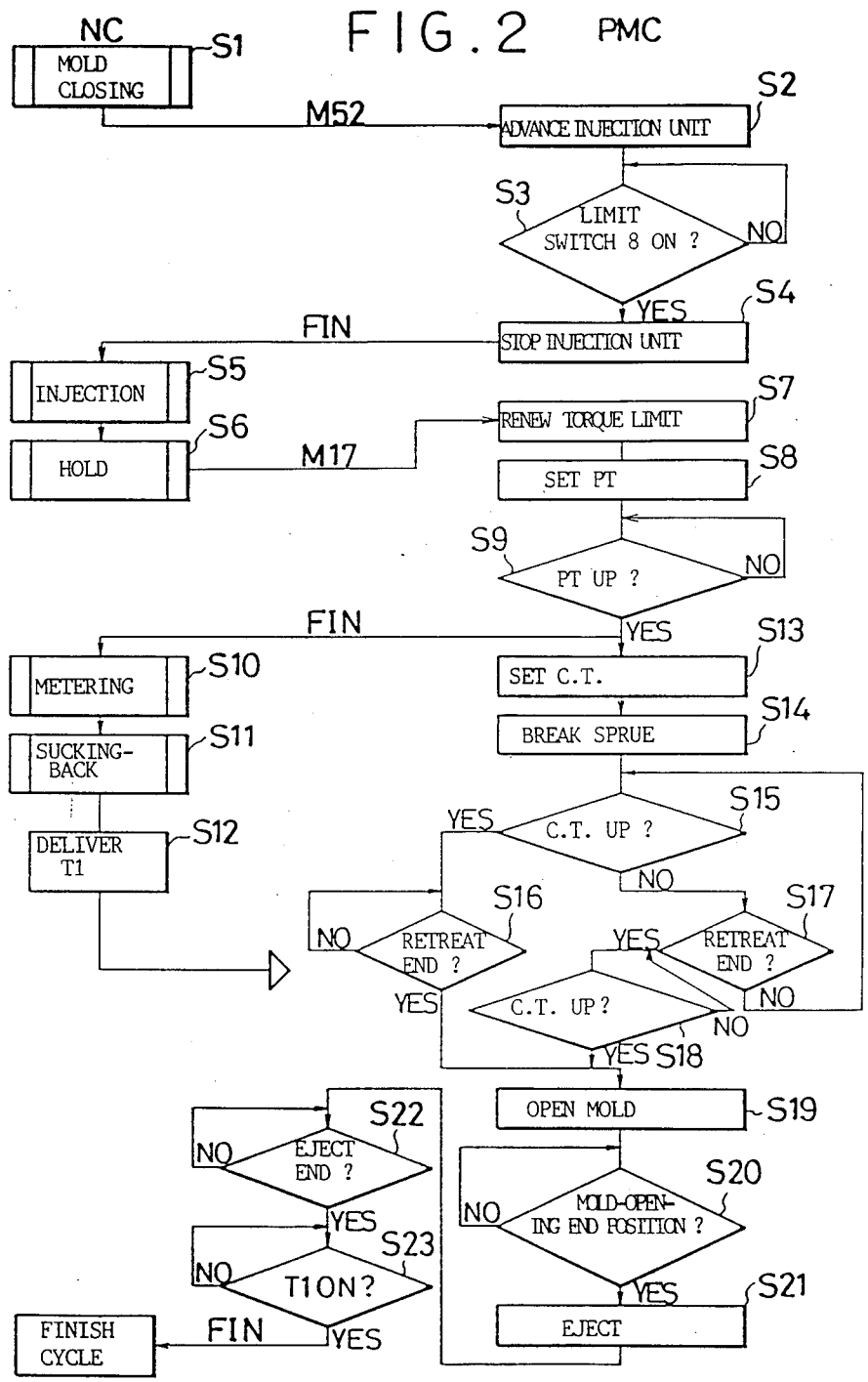

SIMULTANEOUS TWO-AXIS NUMERICAL CONTROL METHOD FOR AN INJECTION-MOLDING MACHINE AND AN APPARATUS THEREFOR

BACKGROUND OF THE INVENTION

The present invention relates to an injection-molding machine controlled by means of a numerical control unit (hereinafter referred to as NC unit), and more particularly, to a numerical control method for an injection-molding machine and an apparatus therefor, capable of executing a mold opening process simultaneously with a metering process.

In an injection-molding cycle, a metering process and a mold opening process are executed subsequent to an injection process and a hold process. The metering process can be started immediately after the completion of hold, while the mold opening process can be started after solidification of resin injected into a mold, that is, after the passage of a cooling period. Usually, the cooling period is shorter than a metering time, so that the cycle time for the manufacture of moldings can be shortened by opening the mold immediately after the termination of the cooling period.

In injection-molding machines using oil pressure as a drive source, various axes, such as an injection axis, metering axis, clamp axis, eject axis, etc., can be controlled independently and simultaneously. Therefore, mold opening is started the moment the cooling period terminates during the metering process, that is, metering operation and mold opening operation are executed simultaneously. According to injectionmolding machines in which the drive of servomotors for their axes is controlled by means of an NC unit, on the other hand, it is difficult for the NC unit to control a plurality axes simultaneously and independently, due the limited computing capability of the NC unit. Accordingly, the mold opening operation is performed after the metering operation is finished. Thus, the prior art injection-molding machines controlled by means of an NC unit require a long cycle time, and therefore, are low in production efficiency.

SUMMARY OF THE INVENTION

Accordingly, an object of the present invention is to shorten the cycle time by driving one axis of an injection-molding machine, controlled by means of an NC unit, simultaneously with another axis when step feed execution conditions are fulfilled while the second axis is being driven, so that a mold opening operation is performed simultaneously with a metering operation when a cooling period terminates during the metering operation.

In order to achieve the above object and other objects, a numerical control method for an injection-molding machine according to the present invention comprises (a) determining whether step feed execution conditions are fulfilled, (b) delivering information for specifying a step feed axis, step feed execution information including the displacement, moving speed, and moving direction of the step feed axis, and step feed command information, from a programmable machine controller for sequentially controlling the injection-molding machine, to a numerical control processing unit, used to control the drive of servomotors for axes of the injectionmolding machine, when the step feed execution conditions are fulfilled, and (c) alternately executing pulse distribution for the step feed axis, based on the step feed execution information, and pulse distribution for an axis separate from the step feed axis, by means of the numerical control processing unit responsive to the step feed command information, while the step feed execution conditions are fulfilled, thereby simultaneously driving the two axes of the injectionmolding machine.

A numerical control apparatus of the present invention, which is used to effect the aforementioned method, comprises a numerical control processing unit for controlling the drive of servomotors for axes of an injection-molding machine; a programmable machine controller for sequentially controlling the injection-molding machine; and a memory unit accessible by both the numerical control processing unit and the programmable machine controller. The programmable machine controller includes determination means for determining whether step feed execution conditions are fulfilled, and memory control means for storing, in the memory unit, information specifying a step feed axis, step feed execution information including the displacement, moving speed, and moving direction of the step feed axis, and step feed command information when the step feed execution conditions are fulfilled. The numerical control processing unit includes determination means for monitoring to see if the step feed command information is stored in the memory unit and determining whether the step feed execution conditions are fulfilled, and means for reading the step feed execution information from the memory unit. In this apparatus, pulse distribution for the step feed axis, based on the step feed execution information, and pulse distribution for an axis separate from the step feed axis are alternately executed by means of the numerical control processing unit responsive to the step feed command information, while the step feed execution conditions are fulfilled, so that the two axes of the injection-molding machine are driven simultaneously.

According to the present invention, as described above, one axis of the injection-molding machine is driven simultaneously with another axis when the step feed execution conditions are fulfilled while the second axis is being driven, so that a mold opening operation can be performed simultaneously with a metering operation after a cooling period terminates during the metering operation. Thus, the cycle time can be shortened, so that the efficiency of the injection-molding machine can be improved.

BRIEF DESCRIPTION OF THE DRAWINGS

FIG. 2 is a flow chart showing an operating process of an NC program and an operating process based on their respective sequence programs.

DESCRIPTION OF THE PREFERRED EMBODIMENT

Figure 1:
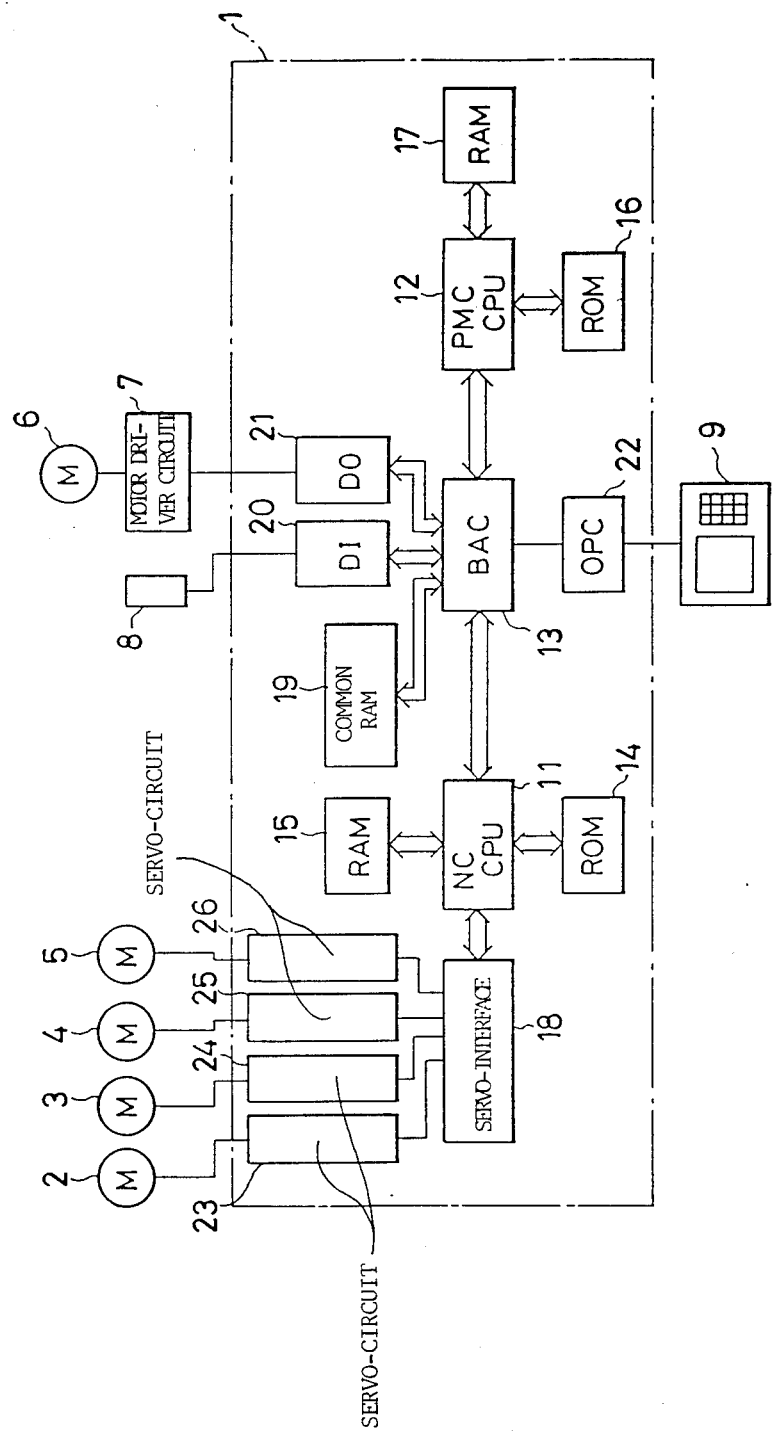
FIG. 1 is a schematic block diagram showing the principal part of a control section of an injection-molding machine according to an embodiment of the present invention.

FIG. 1 shows the principal part of an injectionmolding machine according to an embodiment of the present invention. In FIG. 1, numeral 1 denotes a numerical control unit (hereinafter referred to as NC unit) for controlling an injection-molding machine. The NC unit 1 includes a microprocessor (hereinafter referred to as CPU) 11 for NC, and a CPU 12 for a programmable machine controller (hereinafter referred to as PMC). The NCCPU 11 is connected with a ROM 14, which stores a control program for generally controlling the injection-molding machine, and a RAM 15 for tentative storage of data. The NCCPU 11 is also connected, through a servo-interface 18, with servocircuits 23 to 26 for controlling servomotors 2 to 5 which respectively drive a clamp axis, an eject axis, an injection axis, and a screw rotating axis. A PMCCPU 12 is connected with a ROM 16, which stores a sequence program shown in the right-hand half of FIG. 2 that is executed by the PMCCPU 12 in order to control operations, e.g., a mold opening operation of the injection-molding machine, as mentioned later. The PMCCPU 12 is connected to a RAM 17 used for tentative storage of data.

Figure 3A:
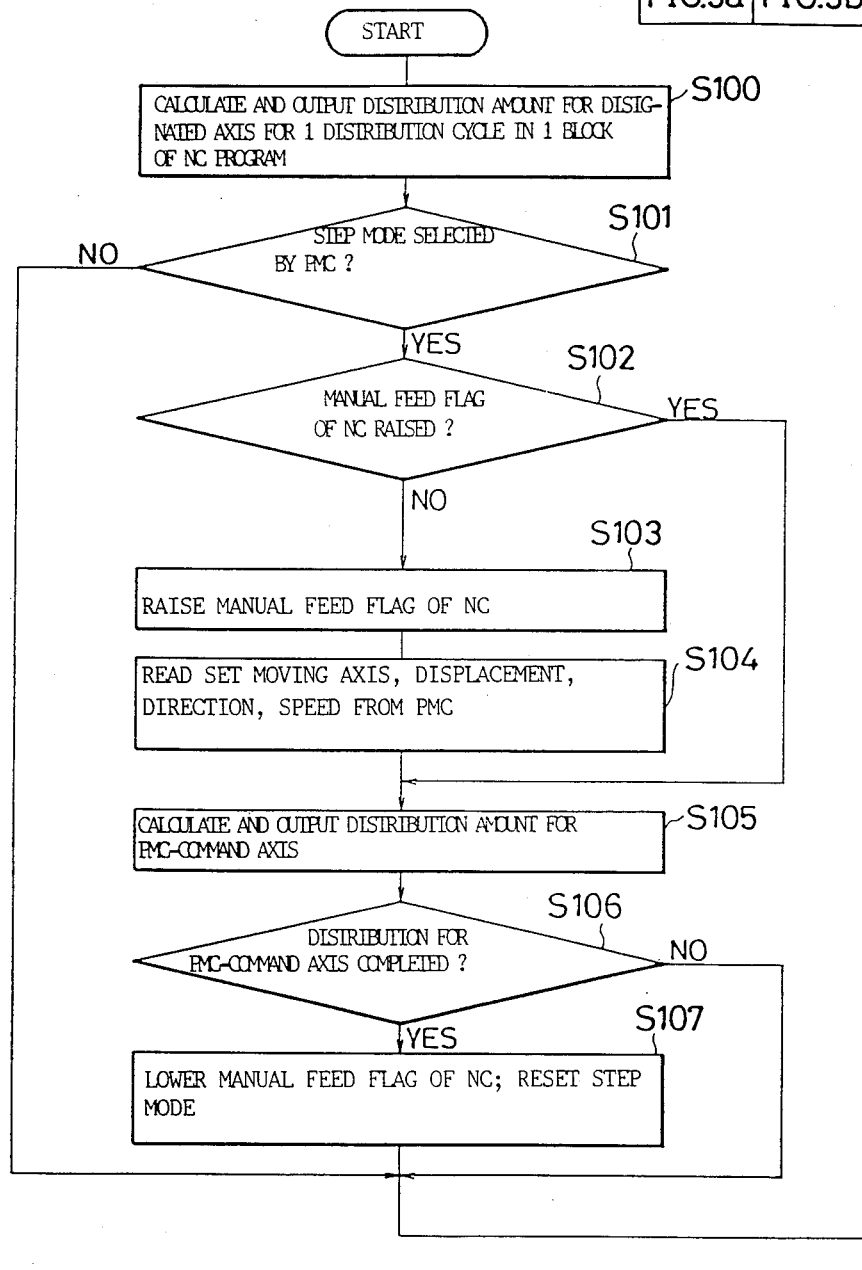
FIGS. 3a and 3b illustrate an operational flow chart of a processing unit for numerical control.
Figure 3B:
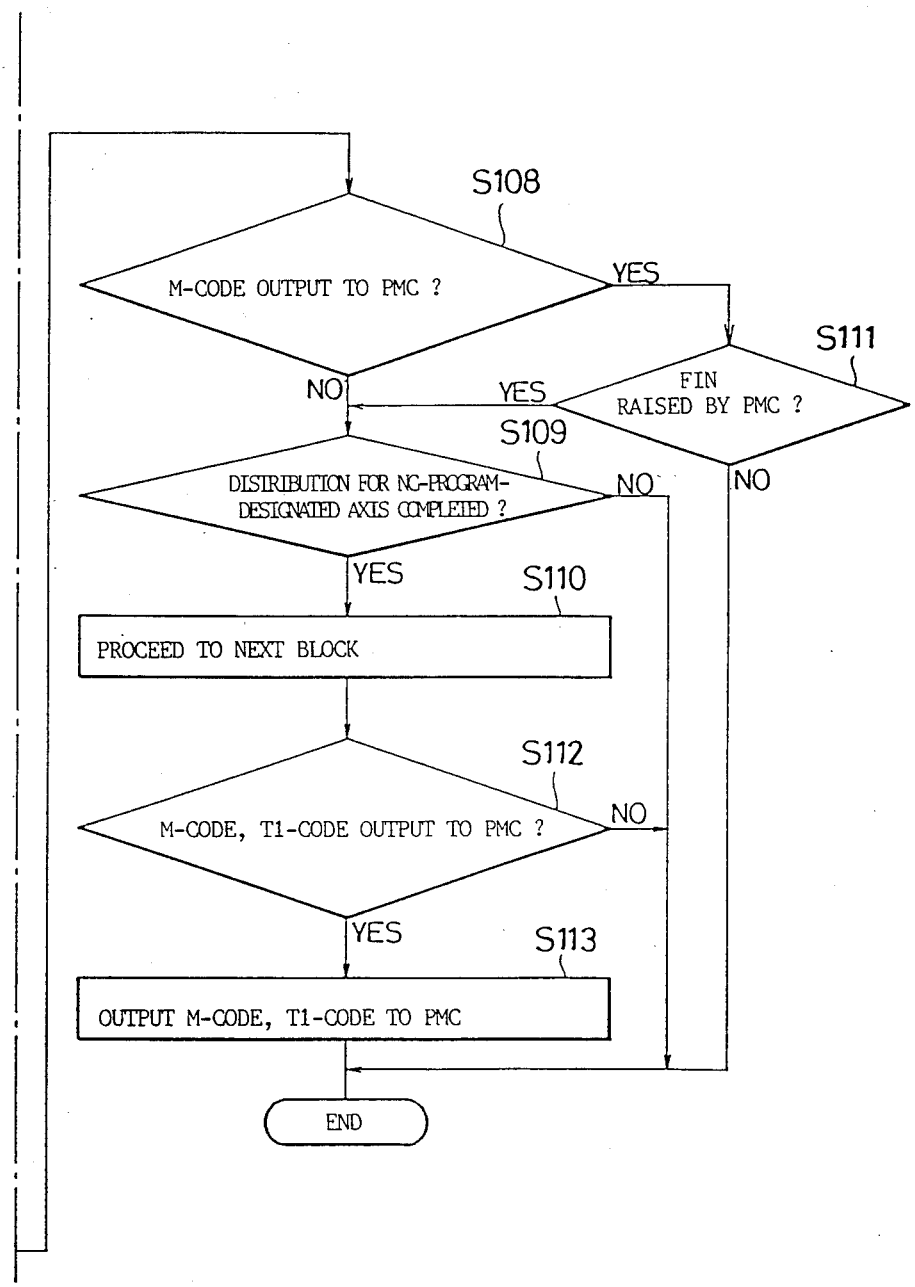

Numeral 19 denotes a nonvolatile common RAM which, includes a backup power source, and stores an NC program shown mainly in FIG. 3 and the left-hand half of FIG. 2. Thus program is executed by the NCCPU 11 in order to control various operations, such as a metering operation, of the injection-molding machine, and to provide various set values, parameters, etc. Numeral 13 denotes a busarbiter controller (hereinafter referred to as BAC), which is connected with the respective buses of the NCCPU 11, the PMCCPU 12, the common RAM 19, an input circuit 20, and an output circuits 21. The bus to be used is controlled by means of the BAC 13. Also, the BAC 13 is connected serially with a manual-date input device 9 with a display (hereinafter referred to as CRT/MDI) through an operator panel controller 22. Moreover, the input circuit 20 is connected with a limit switch 8 for nozzle touch detection which detects contact between a nozzle (not shown) and a mold (not shown). The output circuit 21 is connected with a motor driver circuit 7 of a geared motor 6 which serves to drive an injection unit (not shown) longitudinally.

The operations of the apparatus according to the present embodiment will now be described.

First, various set values, including the mold closing speed, mold opening speed, changing positions for the mold closing and opening speeds, injection speed, injection-speed changing positions, hold pressure, hold time, metering position, etc., are set by means of the CRT/MDI 9, and are stored in predetermined addresses of the common RAM 19.

Thereafter, when a working command is inputted through the CRT/MDI 9 to work the injection-molding machine, the NCCPU 11 first starts a mold closing operation by driving the servomotor 2 for the clamp axis, through the medium of the servo-interface 18 and the servo-circuit 23, in accordance with the NC program (Step S1). When the mold closing operation ends, the NCCPU 11 writes an M-code M52, as a nozzle touch command, in a predetermined region of the common RAM 19 through the BAC 13. At this time, the PMCCPU 12 monitors the contents of this region of the common RAM 19 in accordance with the sequence program. When it is detected that the M-code M52 is written in the RAM 19, the PMCCPU 12 drives the geared motor 6 through the medium of the BAC 13, output circuit 21, and motor driver circuit 7, therby advancing the injection unit (Step S2). When the nozzle touches the mold, thereby turning on the limit switch 8 for nozzle touch detection (Step S3), the PMCCPU 12 stops driving the geared motor 6, stops the advance of the injection unit (Step S4), and writes a completion signal FIN, indicative of the end of the nozzle touch operation, in the common RAM 19. When the NCCPU 11 detects that the completion signal FIN is written in the common RAM 19, it drives the servomotor 4 for the injection axis, for an injecting operation, through the medium of the servointerface 18 and the servo-circuit 25 (Step S5). When a screw advances and reaches a switching position for hold, the operation is switched from the injecting operation over to a hold operation (Step S6). At the time of such switchover, the NCCPU 11 writes an M-code M17, indicative of the hold operation being executed, in the common RAM 19. On detection of the M-code M17 in the common RAM 19, the PMCCPU 12 renews a torque limit value, which is used to limit the output torque of the servomotor 4 for the injection axis in accordance with a set hold pressure, into a value corresponding to the set hold pressure, and sets a hold pressure timer PT (Steps S7 and S8). In the present embodiment, the torque limit value is successively renewed to change the hold pressure level, in order to change the hold pressure by several stages. When the hold pressure timer PT times out (Step S9), a completion signal FIN, indicative of the end of the hold operation, is written in the common RAM 19.

The aforementioned operations (Steps S1 and S9) are performed in the same manner as the operations of an injection-molding machine controlled by means of a conventional NC. The present invention is characterized and differs from the prior art arrangement in that subsequent operations Steps S10 to S23, i.e., metering operation, mold opening operation, and eject operation, are performed simultaneously.

When the completion signal FIN is written in the common RAM 19 due to the hold pressure timer PT timing out (Step S9), the NCCPU 11 detects the completion signal FIN, and drives the servomotor 5 for the screw rotating axis through the medium of the servo-interface 18 and the servo-circuit 26, thus starting the metering operation (Step S10). When metering is finished after a metering point is reached, the servomotor 4 for injection axis is driven to retreat the screw over a fixed distance, thereby executing a sucking-back process (Step S11). When the sucking-back process is finished, a T1-code, indicative of the end of sucking-back, is delivered to and written in the common RAM 19.

Meanwhile, when the hold pressure timer PT elapses (Step S9) starting the metering operation controlled by the NCCPU 11, the PMCCPU 12 sets a cooling timer C.T. (Step S13), and causes the motor driver circuit 7 to drive the geared motor 6, thereby retreating the injection unit to start a sprue break (Step S14). When the injection unit is retreated to a sprue break end position after the cooling timer C.T. times out or the cooling time is up (Steps S15 to S18), the PMCCPU 12 delivers a mold-opening command (Step S19).

On the delivery of the mold-opening command, the PMCCPU 12 writes a step mode selection signal and preset mold-opening control information in a step mode selection memory position and a predetermined memory position, respectively, of the common RAM 19. More specifically, a set mold-opening displacement is written in a step displacement memory position; a set mold opening speed is set in a step speed memory position; information (hereinafter referred to as step feed axis) specifying an axis (clamp axis in this case) to be subjected to step feed, is set in a feed axis memory position; and a feed direction is set in a direction selection memory position. When the PMCCPU 12 sets the aforesaid step mode selection, step displacement, step speed, feed axis, and direction in the common RAM 19, the NCCPU 11 performs pulse distribution for the axis designated by the NC program, i.e., the screw rotating axis, in accordance with the NC program. At the same time, the NCCPU 11 performs pulse distribution such that the axis (clamp axis) designated by the step mode is driven for the designated step displacement in the designated direction, at the designated step speed.

Thus, the NCCPU 11 need not calculate the moldopening control information. Under the control of the NC unit, therefore, the servomotor 2 of the clamp axis is driven simultaneously with the servomotor 5 of the screw rotating axis (for metering) or the servomotor 4 of the injection axis (for sucking-back). In this manner, the mold opening process is executed simultaneously with the metering or sucking-back process.

Therefore, when the clamp axis reaches a moldopening end position, the PMCCPU 12 detects a moldopening end, in accordance with the value stored in a current-value register for the clamp axis (Step S20), and delivers an eject command. The eject operation responsive to the eject command, like the mold opening operation, is performed in a step mode. When the eject command is issued, step mode selection, eject displacement, feed speed, feed axis (eject axis), and feed direction (forward) are written individually in predetermined memory positions of the common RAM 19, in the same manner as for the mold opening operation.

In accordance with the information written in this manner, the servomotor 3 for the eject axis is driven. When a current-value register for eject axis attains a set value, thereafter, the eject axis is retreated in a step mode for the opposite feed direction (Step S21). If these advancing and retreating actions are repeated at a predetermined frequency, it is concluded that ejection is finished (Step S22). Then, the PMCCPU 12 determines whether the T1-code, indicative of the end of sucking-back, is written in the common RAM (Step S23). When this code is written, one cycle of injection-molding operation ends. Then, the mold closing operation (Step S1) is restarted.

Thus, while the drive of the screw rotating axis (for metering) or the injection axis (for sucking-back) is being controlled in accordance with the NC program, the clamp axis (mold opening operation) or the eject axis (eject operation) is driven in a step mode.

Referring now to the operational flow chart of FIG. 3 for the NCCPU 11, the aforementioned simultaneous two-axis processing will be further described.

The NCCPU 11 performs the operations shown in FIG. 3 in predetermined cycles. First, the NCCPU 11 reads one block of the NC program, calculates the amount of pulse distribution for one distribution cycle, and delivers the calculated amount of pulse distribution to the axis designated in the block concerned (Step S100). Then, the NCCPU 11 reads the contents of the step mode selection memory position of the common RAM 19, and determines whether the step mode selection signal is written therein (Step S101). If the step mode is not selected, the NCCPU 11 determines, in Step S108, whether the M-code has been delivered to the PMCCPU 12, on the basis of the memory contents of the common RAM 19. If the M-code has not been delivered, the NCCPU 11 determines whether the pulse distribution for the axis designated in the proper block of the NC program is completed (Step S109). If the pulse distribution is not completed, this cycle of processing is finished. In the next cycle, pulse distribution for the proper block is performed in the same manner in Step S100, and Step S100 and the subsequent steps are then executed as described above. Thus, a series of processes, including Steps S100, S101, S108, and S109, is executed repeatedly.

When the pulse distribution for the block concerned is completed (Step S109), the NCCPU 11 reads the next block (Step S110). If the M-code is contained in the proper block (Step S112), it is delivered to the common RAM 19 and to the PMCCPU 12 (Step S113). Thereafter, the processes of Step S100 and the subsequent steps are repeated again. If the mold closing operation shown in Step S1 of FIG. 2 is being executed at this time, then no step mode is selected, and the NCCPU 11 repeatedly executes a series of processes, including Steps S100, S101, S108, S109, S110, S112, and S113, thereby distributing pulses to the servomotor 2 for clamp axis.

Thereafter, when the next block is read (Step 110) immediately after the mold closing is finished, the M-code M52, which is contained as the nozzle touch command in the block, is written in the common RAM 19 in Step S113. Then, the program returns to Step S100, and proceeds to Steps S101 and S108. Since the M-code M52 is currently being delivered, the decision in Step S108 is affirmative, so that the program proceeds to Step S111. Thereupon, whether the completion signal FIN is written in the common RAM 19 is determined (Step S111). If the FIN signal is not written, a series of processes, including Steps S100, S101, S108, and S111, is repeated. In response to the M-code M52, the PMCCPU 12 advances the injection unit so that the nozzle touch operation is completed. Since a command for movement is not contained in the block read in Step S110, the NCCPU 11 is on stand-by without performing pulse distribution in the meantime. When the PMCCPU 12 writes the FIN signal in the common RAM 19 after the nozzle touch operation is completed, the NCCPU 11 detects this (Step S111), and determines whether pulse distribution for the block concerned is completed (Step S109). During the nozzle touch operation, as described above, no pulse distribution is performed. Therefore, pulse distribution never fails to be finished before the end of the nozzle touch operation, so that the NCCPU 11 reads the next block (Step S110). The next block is related to the injecting operation (Step S5 of FIG. 2), and does not, therefore, contain the M-code. Thus, in this injecting operation, the process of Steps S100, S101, S108, and S109 are repeated. Each time pulse distribution for one block is finished as a result of such processing, the processes of Steps S110, S112, and S113 are repeated, thereby effecting pulse distribution for the injection axis.

When a block for a hold command (Step S6) is read (Step S110) after the screw reaches the injection-to-hold switching position, the M-code M17 as a command for torque limit renewal is delivered (Steps S112 and S113). In the next step or Step S100, the NCCPU 11 performs pulse distribution for the injection axis to effect hold. Meanwhile, the PMCCPU 12 reads the M-code M17 from the common RAM 19 at the time of injection-to-hold switching, and successively renews the torque limit set in a multistep mode (Step S7). When the hold pressure timer PT, which is set at the time of injection-to-hold switching, elapses, the PMCCPU 12 writes the completion signal FIN in the common RAM 19 (Steps S8 and S9). During the hold operation (Step S6), the NCCPU 11 repeats the processes of Steps S100, S101, S108, and S111. When the FIN signal is written in the common RAM 19 (Step S111), the NCCPU 11 determines whether pulse distribution is completed (Step S109). The amount of pulse distribution during the hold operation is so small that the delivery of pulses to an error register of the servo-circuit for injection axis is already finished at that time. During the hold operation, moreover, the screw is prevented from moving by the reaction force of resin, and the movement command stands in the error register. However, a command torque responsive to this movement command is restricted to a level lower than the torque limit, and the servomotor for injection axis operates so as to apply a force equivalent to the set hold pressure to the resin.

For this reason, the decision in Step 109 is affirmative, so that the program proceeds to the next block (Step S110), that is, the block for the metering operation (Step S10). Then, the NCCPU 11 repeats the processes of Steps S112, S113 (M-code is not contained in the metering block), S100, S101. S108, and S109, thereby effecting the metering operation. On the other hand, when the sprue break ends (Steps S13 to S18) after the cooling period terminates, as aforesaid, the PMCCPU 13 stores in the common RAM 19 a step mode selection signal, step displacement, step speed, and the information indicative of the step feed axis, i.e., the clamp axis, and the feed direction thereof (Step S19). At the end of the cooling period and the sprue break, therefore, the NCCPU 11 concludes (Step S101), on the basis of the memory contents of the common RAM 19, that the step mode is selected in Step S101. Since the step mode is selected in this case, the NCCPU 11 further determines whether a manual feed flag is raised (Step S102). The manual feed flag is not raised in the cycle immediately after the detection of the selection of the step mode. If the flag is not raised although the step mode is selected, the manual feed flag is raised (Step S103), and the PMCCPU 12 reads the step feed axis, displacement, direction, and moving speed set in the common RAM 19 (Step S104). In Step S19, the clamp axis is set as the step feed axis, so that the amount of distribution for one distribution cycle for the clamp axis, corresponding to the set displacement, is calculated. Pulses corresponding in number to the calculated quantity of distributed pulses, along with a signal indicative of the set moving directions, are delivered to the servo-circuit 23 in a cycle corresponding to the set moving speed (Step S105), and the servomotor 2 for clamp axis is driven for mold opening operation. More specifically, the axis designated in accordance with the NC program, i.e., the screw rotating axis (servomotor 5) for metering, is driven is Step S100, while the clamp axis (servomotor 2) is driven in Step S105. Thus, simultaneous two-axis control is effected.

During the simultaneous two-axis control, the NCCPU 11 determines whether pulse distribution for the clamp axis, as the step feed axis designated by the PMCCPU 12, is completed (Step S106). If this distribution is not completed, the program proceeds to Step S108, and the NCCPU 11 determines whether the M-code has been delivered to the PMCCPU 12. During the metering operation, the M-code is not delivered, so that the NCCPU 11 then determines whether pulse distribution for the block concerned, with respect to the axis designated in accordance with the NC program, i.e., the screw rotating axis, is finished (Step S109). If this pulse distribution is not finished, the NCCPU 11 executes the processes of Step S100 and the subsequent steps again. Thus, pulse distribution for metering, with respect to the servomotor of the screw rotating axis, is performed in Step S100. Since the step mode is already selected and as the manual feed flag is already raised, the program then proceeds to Step S105 via Steps S101 and S102. Thereupon, the PMCCPU 12 performs pulse distribution for the clamp axis as the step feed axis. Then, whether the pulse distribution for the clamp axis is completed is determined in Step S106. If this pulse distribution is not completed, the program proceeds through Step S108 to Step S109, whereupon whether pulse distribution for the screw rotating axis is completed is determined. If this pulse distribution is not completed, the processes of Steps S100, S101, S102, S105, S106, S108, and S109 are repeated.

When the pulse distribution for the clamp axis is completed, that is, when the mold opening is finished, as the pulse distribution for the two axes is repeated in this manner, such completion of the pulse distribution is detected in Step S106. Then, the manual feed flag is lowered, and the step mode is reset (Step S107). The pulse distribution for the screw rotating axis for metering is still being performed in Step S100.

Meanwhile, the PMCCPU 12 monitors the value of the current-value register for clamp axis in a task of an order one grade higher than the order of the present program. When it detects the completion of the mold opening on the basis of the value of the current-value register, the PMCCPU 12 writes the step mode selection signal again in the common RAM 19. Further, the PMCCPU 12 stores, in the comomon RAM 19, at the predetermined memory positions thereof, the step feed execution information previously set in the common RAM 19, including the displacement of an ejector rod as the step displacement, ejecting speed as the step speed, eject axis as the step feed axis, ejecting direction as the feed direction.

As a result, the NCCPU 11, while executing the pulse distribution for metering, detects the step mode selection in Step S101, raises the manual flag in a first cycle for ejection (STeps S102 and S103), reads the eject axis designated as the step feed axis, feed direction, feed speed, and feed amount from the common RAM 19 (Step S104), and performs pulse distribution in accordance with these data (Step S105). If this pulse distribution is not completed (Step S106), the program proceeds through Step S108 to Step S109, whereupon whether pulse distribution for the screw rotating axis for metering is completed is determined. If this pulse distribution is not completed, it is continued in Step S100. Thus, the processes of operation of Steps S100, S101, S102, S105, S106, S108, and S109 are repeated.

When the distribution is completed as the amount of pulse distribution for ejection attains a set level of displacement (Step S106), the manual flag is lowered, and the step mode is reset (Step S107). When the PMCCPU 12 detects the movement of the ejector rod for a set distance in accordance with the value of the current-value register, in the same manner as aforesaid, after the completion of the pulse distribution, the CPU 12 causes the ejector rod to retreat. More specifically, the PMCCPU 12 writes the step mode selection signal in the common RAM 19 as aforesaid, and stores in the common RAM 19 the eject axis as the step feed axis, ejecting speed, displacement, and feed direction (reverse). Accordingly, the NCCPU 11 performs pulse distribution for the screw rotating axis for metering (Step S100), and also performs step-mode pulse distribution for the eject axis (Step S105), in the same manner as aforesaid, thereby effecting the metering and ejection simultaneously.

Thus, when the ejector is returned by being moved for the set displacement, it is advanced again in the step mode as mentioned before. When the ejector rod is reciprocated for a set frequency (this frequency may be set in the common RAM or incorporated in the program), the PMCCPU 12 detects this, and finishes the eject operation (Step S22). Then, the PMCCPU 12 determines whether the code T1, indicative of the end of the sucking-back process, is transferred from the NCCPU 11 to the common RAM 19 (Step S23).

During the metering process (Step S10), on the other hand, the NCCPU 11 performs pulse distribution for the servomotor 5 for screw rotating axis for such metering in Step S100. When the pulse distribution for the metering ends as detected in Step S109, the program proceeds to the next block, i.e., a block for a sucking-back command. This sucking-back command is a process for retreating the injection axis or the screw for a predetermined distance. After pulse distribution for the injection servomotor 4 is executed for such sucking-back in Step S100, the program proceeds to the next block in Step S110. Since the T1-code is contained in this next block, it is written in the common RAM 19 (Steps S112 and S113).

Thus, when the cooling time, mold opening, and eject operation are finished, and if the PMCCPU 12 reads the T1-code from the common RAM 19 (Step S23), one cycle of injection-molding operation ends. Then, the mold closing operation of Step S1 is started again.

What is claimed is:

1. A numerical control method for an injection-molding machine that is sequentially controlled by a programmable machine controller, the injection-molding machine having step feed conditions and including servomotors for driving axes of the injection-molding machine under control of a numerical control processing unit, said method comprising:
   (a) determining whether the step feed conditions are fulfilled;
   (b) specifying one of the axes to be step fed;
   (c) providing step feed execution information including step displacement, moving speed, and moving direction of the axis to be step fed, and step feed command information, from the programmable machine controller, to the numerical control processing unit when said step feed conditions are fulfilled; and
   (d) alternately executing pulse distribution for the axis to be step fed based on said step feed execution information, and pulse distribution for another one of the axes, by means of the numerical control processing unit responsive to said step feed command information, while said step feed conditions are fulfilled so that the numerical control processing unit simultaneously drives the axis to be step fed and the another one of the axes in accordance with said step feed information received from the programmable machine controller.

2. A numerical control method for an injection-molding machine according to claim 1, wherein the injection-molding machine further includes a memory means accessible by both the programmable machine controller and the numerical control processing unit and wherein step (c) is performed by the memory means.

3. A numerical control method for an injection-molding machine according to claim 1, wherein the injection-molding machine performs a mold opening operation by moving a clamp axis and has a cooling period, and the numerical control processing unit performs a metering operation and wherein step (a) includes the substep of:
   determining when the cooling period terminates; and step (b) includes the substep of:
   specifying the clamp axis as the axis to be step fed, so that step (d) simultaneously performs the metering operation and the mold opening operation.

4. A numerical control method for an injection-molding machine according to claim 1, wherein the injection-molding machine performs an eject operation by moving an eject axis and performs a metering operation, and the numerical control processing unit performs a metering operation and wherein step (a) includes the substep of:
   determining when the mold opening operation is completed; and step (b) includes the substep of:
   specifying the eject axis as the axis to be step fed, so that step (d) simultaneously performs the metering operation and the eject operation.

5. A numerical control method for an injection-molding machine according to claim 2, wherein the injection-molding machine performs a mold opening operation by moving a clamp axis and has a cooling period, and the numerical control processing unit performs a metering operation and wherein step (a) includes the substep of:
   determining when the cooling period terminates; and step (b) includes the substep of:
   specifying the clamp axis as the axis to be step fed, so that step (d) simultaneously performs the metering operation and the mold opening operation.

6. A numerical control method for an injection-molding machine according to claim 2, wherein the injection-molding machine performs an eject operation by moving an eject axis and performs a metering operation, and the numerical control processing unit performs a metering operation and wherein step (a) includes the substep of:
   determining when the mold opening operation is completed; and step (b) includes the substep of:
   specifying the eject axis as the axis to be step fed, so that step (d) simultaneously performs the metering operation and the eject operation.

7. A numerical control apparatus for an injection-molding machine having step feed conditions and including axes and servomotors for driving the axes, the apparatus comprising:
   a numerical control processing means for controlling the servomotors;
   a programmable machine controller means for sequentially controlling the injection-molding machine; and
   a memory means accessible by both said numerical control processing means and said programmable machine controller means;
   said programmable machine controller means including:
   first determination means for determining whether the
   step feed conditions are fulfilled, and memory control means for storing information specifying a step feed axis, step feed execution information including a displacement, a moving speed, and a moving direction of said step feed axis, and step feed command information in said memory means when said step feed conditions are fulfilled, said numerical control processing means including:

second determination means for determining if said step feed command information is stored in said memory means and for determining whether said step feed conditions are fulfilled, and means for reading said step feed execution information from said memory means, and for alternately performing pulse distribution while said step feed conditions are fulfilled for said step feed axis, based on said step feed execution information, and pulse distribution for another one of the axes in response to said step feed command information, so that said numerical control processing means simultaneously drives said step feed axis and said another one of the axes are driven simultaneously in accordance with said step feed execution information stored in said memory means by said programmable machine controller means.

8. A numerical control apparatus for an injection-molding machine according to claim 7, wherein the injection-molding machine performs a mold opening operation by moving a clamp axis and has a cooling period and wherein said numerical control processing means includes means for performing a metering operation, and said first determination means includes means for determining that said step feed conditions are fulfilled, and said memory control means includes means for specifying the clamp axis as said step feed axis, so that the metering operation and the mold opening operation are performed simultaneously.

9. A numerical control apparatus for an injection-molding machine according to claim 7, wherein the injection-molding machine performs an eject operation by moving an eject axis and wherein said numerical control processing means includes means for performing a metering operation, and said second determination means includes means for determining that said step feed conditions are fulfilled, and said memory control means includes means for specifying the eject axis as said step feed axis, so that the metering operation and an eject operation are performed simultaneously.

10. A numerical control apparatus for an injection-molding machine according to claim 8, wherein the injection-molding machine performs an eject operation by moving an eject axis and wherein said numerical control processing means includes means for performing a metering operation, and said second determination means includes means for determining that said step feed conditions are fulfilled, and said memory control means includes means for specifying the eject axis as said step feed axis, so that the metering operation and an eject operation are performed simultaneously.

* * * * *